United States Patent
Sparapani et al.

(10) Patent No.: US 10,684,890 B2
(45) Date of Patent: Jun. 16, 2020

(54) NETWORK DEPLOYMENT FOR CELLULAR, BACKHAUL, FIBER OPTIC AND OTHER NETWORK INFRASTRUCTURE

(71) Applicant: Accenture Global Services Limited, Dublin (IE)

(72) Inventors: Fabrizio Sparapani, Rovellasca (IT); Paola Liuni, Milan (IT); Marco Grigoletti, Milan (IT); Donatella Enei, Agrate Brianza (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 603 days.

(21) Appl. No.: 15/064,254

(22) Filed: Mar. 8, 2016

(65) Prior Publication Data
US 2016/0328264 A1 Nov. 10, 2016

Related U.S. Application Data

(60) Provisional application No. 62/158,986, filed on May 8, 2015.

(51) Int. Cl.
| | |
|---|---|
| *G06Q 10/06* | (2012.01) |
| *G06F 9/48* | (2006.01) |
| *G06F 8/60* | (2018.01) |
| *G06F 8/65* | (2018.01) |
| *H04W 16/18* | (2009.01) |
| *H04L 29/08* | (2006.01) |
| *H04W 4/021* | (2018.01) |

(52) U.S. Cl.
CPC .............. *G06F 9/4881* (2013.01); *G06F 8/60* (2013.01); *G06F 8/65* (2013.01); *G06F 9/4887* (2013.01); *G06Q 10/06312* (2013.01); *G06Q 10/06316* (2013.01); *G06Q 10/063116* (2013.01); *H04W 16/18* (2013.01); *G06Q 10/0633* (2013.01); *H04L 67/18* (2013.01); *H04L 67/22* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 2006/0270421 A1* | 11/2006 | Phillips ................. | H04W 4/021 455/457 |
| 2007/0088709 A1* | 4/2007 | Bailey ................. | G06F 3/04815 |
| 2007/0300224 A1* | 12/2007 | Aggarwal .............. | G06Q 10/06 718/100 |

(Continued)

OTHER PUBLICATIONS

Yuan, "Attributed Based Access Control (ABAC) for Web Services," 2005, Proc. Of the IEEE International Conference on Web Services, pp. 1-9 (Year: 2005).*

(Continued)

*Primary Examiner* — Ivan R Goldberg
(74) *Attorney, Agent, or Firm* — Mannava & Kang, P.C.

(57) ABSTRACT

According to an example, a network deployment system facilitates deploying of cellular network infrastructure, including cellular network equipment for cellular sites and connection of the cellular sites to a backhaul network, or deploying of fiber optic network infrastructure. Workflows are generated and executed for deploying the network infrastructure.

17 Claims, 19 Drawing Sheets

(56) References Cited

U.S. PATENT DOCUMENTS

| | | | |
|---|---|---|---|
| 2008/0288539 A1* | 11/2008 | Jacobs | G06Q 10/02 |
| 2008/0304644 A1* | 12/2008 | Mishra | H04L 29/06027 |
| | | | 379/201.12 |
| 2010/0223557 A1 | 9/2010 | Kenney et al. | |
| 2010/0305987 A1* | 12/2010 | Correll | G06Q 10/06 |
| | | | 705/7.28 |
| 2011/0184771 A1* | 7/2011 | Wells | G06Q 10/04 |
| | | | 705/7.14 |
| 2013/0013198 A1* | 1/2013 | Adrain | G01C 21/3461 |
| | | | 701/468 |
| 2013/0197958 A1* | 8/2013 | Kawecki | G06Q 10/0633 |
| | | | 705/7.15 |
| 2013/0203445 A1* | 8/2013 | Grainger | H04W 4/021 |
| | | | 455/456.3 |
| 2014/0233424 A1* | 8/2014 | Cvijetic | H04W 16/18 |
| | | | 370/254 |
| 2015/0073845 A1 | 3/2015 | Bassiri | |
| 2015/0095097 A1* | 4/2015 | DeJardine | G06Q 10/0633 |
| | | | 705/7.27 |
| 2015/0339619 A1* | 11/2015 | Dumont | G06Q 10/063116 |
| | | | 705/7.16 |

OTHER PUBLICATIONS

Sahib, "M-Governance: Smartphone Applications for Smarter Cities—Tapping GPS and NFC Technologies" in "E-Governance for Smart Cities," online Nov. 2014, Springer, pp. 245-306 (Year: 2014).*

* cited by examiner

```
<soapenv:Envelope xmlns:soapenv="http://schemas.xmlsoap.org/soap/envelope/">
      <soapenv:Header/>
      <soapenv:Body>
            <urn:CreateNewWorkRequest
xmlns:urn="urn:PegaRULES:SOAP:LTESiteDeployment:StartLTESiteDeployment">
                  <OPERATOR_ID>operator</OPERATOR_ID>
                  <CODESEGMENT_REQ_ID>51103</CODESEGMENT_REQ_ID>
                  <TIMESTAMP>20160201T13:16:11</TIMESTAMP>
                  <CODESEGMENT_INSTANCE>
                        <CODESEGMENT_INSTANCE_ID>50845</CODESEGMENT_INSTANCE_ID>
                        <PROGRAM>
                              <PROGRAM_NAME>New Generation Network</PROGRAM_NAME>
                              <PROJECT>

<PROJECT_NAME>NewLTESiteCreationProject#3478</PROJECT_NAME>
                                    <SUBPROJECT>

<SUBPROJECT_NAME>NewLTESiteCreation_South#5919</SUBPROJECT_NAME>
                                          <COMMIT_DATE>20170201T131611.000</COMMIT_DATE>
                                          <BASELINE_DATE>20160609T000000.000</BASELINE_DATE>
                                          <PRIORITY>Medium</PRIORITY>
                                          <PROJECT_ACCOUNTABLE/>
                                          <ESTIMATED_COST>18715</ESTIMATED_COST>

<SITES>
                                                <SITE_ID>Texas_DallasAG00086</SITE_ID>

<BH_SITE_ID/>
                                          </SITES>
```

FIG. 5B

```xml
<TASK_NAME>Procurements Process</TASK_NAME>
<DURATION>1</DURATION>
<START_DATE>20160505T000000.000</START_DATE>
<BASELINE_DATE>20160506T000000.000</BASELINE_DATE>
<COMMIT_DATE>20160201T131611.000</COMMIT_DATE>
<CURRENT_ESTIMATED_COST>900</CURRENT_ESTIMATED_COST>
<ROLE/>
<OWNER_TYPE>Provider</OWNER_TYPE>
<VENDOR>Vendor5</VENDOR>
<CURRENT_ASSIGNEE>AssignedEngineers</CURRENT_ASSIGNEE>
<TaskSOUniqueId>50851</TaskSOUniqueId>
<TASK_CODE>tsk: Procurements Process (1)</TASK_CODE>
<OWNER>
    <OWNER_TYPE>Provider</OWNER_TYPE>
    <SKILL/>
    <OWNER_COMPANY>Vendor5</OWNER_COMPANY>
    <WORKGROUP/>
</OWNER>
<ASSIGNEE>
    <AssigneeNAME>AssignedEngineers</AssigneeNAME>
    <AssigneeCOMPANY>Vendor5</AssigneeCOMPANY>
    <SKILLS/>
</ASSIGNEE>
<LIST_OF_EQUIPMENTS>
    <EQUIPMENT>
        <EQUIPMENT_NAME/>
        <EQUIPMENT_ID>50934</EQUIPMENT_ID>
        <VENDOR_EQUIPMENT_ID/>
        <EQUIP_TYPE>Power supply</EQUIP_TYPE>
        <EQUIP_MANUFACTURER>Vendor4</EQUIP_MANUFACTURER>
        <EQUIPMENT_COST/>
        <EQUIPMENT_QUANTITY>1</EQUIPMENT_QUANTITY>
        <SERVICE_ID>50907</SERVICE_ID>
        <ITEM_FOID/>
        <SERVICE_NAME/>
        <SERVICE_TYPE>S&I</SERVICE_TYPE>
        <SERVICE_VENDOR>Vendor5</SERVICE_VENDOR>
        <SERVICE_QTY>1</SERVICE_QTY>
        <SERVICE_COST/>
    </SERVICE>
</LIST_OF_SERVICES>
```

FIG. 5C

```xml
Preliminary Radio Design</TASK_NAME>
    <DURATION>1</DURATION>
    <START_DATE>20160511T000000.000</START_DATE>
    <BASELINE_DATE>20160512T000000.000</BASELINE_DATE>
    <COMMIT_DATE>20160201T131613.000</COMMIT_DATE>
    <CURRENT_ESTIMATED_COST>1000</CURRENT_ESTIMATED_COST>
    <ROLE/>
    <OWNER_TYPE>Provider</OWNER_TYPE>
    <VENDOR>Vendor2</VENDOR>
    <CURRENT_ASSIGNEE>AssignedEngineers</CURRENT_ASSIGNEE>
    <TaskSOUniqueId>50863</TaskSOUniqueId>
    <TASK_CODE>tsk: Preliminary Radio Design (6.2)</TASK_CODE>
    <OWNER>
        <OWNER_TYPE>Provider</OWNER_TYPE>
        <SKILL/>
        <OWNER_COMPANY>Vendor2</OWNER_COMPANY>
        <WORKGROUP/>
    </OWNER>
    <ASSIGNEE>
        <AssigneeNAME>AssignedEngineers</AssigneeNAME>
        <AssigneeCOMPANY>Vendor2</AssigneeCOMPANY>
        <SKILLS/>
    </ASSIGNEE>
    <LIST_OF_EQUIPMENTS>
        <EQUIPMENT>
            <EQUIPMENT_NAME/>
            <EQUIPMENT_ID>50940</EQUIPMENT_ID>
            <VENDOR_EQUIPMENT_ID/>
            <EQUIP_TYPE>Stairs</EQUIP_TYPE>
            <EQUIP_MANUFACTURER>Vendor4</EQUIP_MANUFACTURER>
            <EQUIPMENT_COST/>
            <EQUIPMENT_QUANTITY>1</EQUIPMENT_QUANTITY>
        </EQUIPMENT>
    </LIST_OF_EQUIPMENTS>
    <LIST_OF_SERVICES>
        <SERVICE>
            <SERVICE_ID>50913</SERVICE_ID>
            <ITEM_POID/>
            <SERVICE_NAME/>
            <SERVICE_TYPE>Construction</SERVICE_TYPE>
            <SERVICE_VENDOR>Vendor2</SERVICE_VENDOR>
            <SERVICE_QTY>1</SERVICE_QTY>
            <SERVICE_COST/>
        </SERVICE>
    </LIST_OF_SERVICES>
</TASKS>
```

FIG. 5D

```
Approval</TASK_NAME>
<DURATION>1</DURATION>
<START_DATE>20160524T000000.000</START_DATE>
<BASELINE_DATE>20160525T000000.000</BASELINE_DATE>
<COMMIT_DATE>20160201T131616.000</COMMIT_DATE>
<CURRENT_ESTIMATED_COST>75</CURRENT_ESTIMATED_COST>
<ROLE/>
<OWNER_TYPE>Client</OWNER_TYPE>
<VENDOR>Vendor6</VENDOR>
<CURRENT_ASSIGNEE>AssignedEngineers</CURRENT_ASSIGNEE>
<TaskSOUniqueId>50879</TaskSOUniqueId>
<TASK_CODE>tsk: PSC Approval (11)</TASK_CODE>
<OWNER>
    <OWNER_TYPE>Client</OWNER_TYPE>
    <SKILL/>
    <OWNER_COMPANY>Vendor6</OWNER_COMPANY>
    <WORKGROUP/>
</OWNER>
<ASSIGNEE>
    <AssigneeNAME>AssignedEngineers</AssigneeNAME>
    <AssigneeCOMPANY>Vendor6</AssigneeCOMPANY>
    <SKILLS/>
</ASSIGNEE>
<LIST_OF_EQUIPMENTS>
    <EQUIPMENT>
    ...
</LIST_OF_EQUIPMENTS>
<LIST_OF_SERVICES>
    <SERVICE>
    ...
</LIST_OF_SERVICES>
```

FIG. 5E

```
<TASK_NAME>Equipment Installation & Test</TASK_NAME>
<DURATION>1</DURATION>
<START_DATE>20160602T000000.000</START_DATE>
<BASELINE_DATE>20160603T000000.000</BASELINE_DATE>
<COMMIT_DATE>20160201T131618.000</COMMIT_DATE>
<CURRENT_ESTIMATED_COST>600</CURRENT_ESTIMATED_COST>
<ROLE/>
<OWNER_TYPE>Provider</OWNER_TYPE>
<VENDOR>Vendor4</VENDOR>
<CURRENT_ASSIGNEE>AssignedEngineers</CURRENT_ASSIGNEE>
<TaskSQUniqueId>50893</TaskSQUniqueId>
<TASK_CODE>tsk: Equipment Installation & Test
(16.3)</TASK_CODE>
<OWNER>
    <OWNER_TYPE>Provider</OWNER_TYPE>
    <SKILL/>
    <OWNER_COMPANY>Vendor4</OWNER_COMPANY>
    <WORKGROUP/>
</OWNER>
<ASSIGNEE>
    <AssigneeNAME>AssignedEngineers</AssigneeNAME>
    <AssigneeCOMPANY>Vendor4</AssigneeCOMPANY>
    <SKILLS/>
</ASSIGNEE>
<LIST_OF_EQUIPMENTS>
    <EQUIPMENT>
        <EQUIPMENT_NAME/>
        <EQUIPMENT_ID>50955</EQUIPMENT_ID>
        <VENDOR_EQUIPMENT_ID/>
        <EQUIP_TYPE>Carpentry</EQUIP_TYPE>
        <EQUIP_MANUFACTURER>Vendor5</EQUIP_MANUFACTURER>
        <EQUIPMENT_COST/>
        <EQUIPMENT_QUANTITY>1</EQUIPMENT_QUANTITY>
    </EQUIPMENT>
</LIST_OF_EQUIPMENTS>
<LIST_OF_SERVICES>
    <SERVICE>
        <SERVICE_ID>50928</SERVICE_ID>
        <ITEM_FOID/>
        <SERVICE_NAME/>
        <SERVICE_TYPE>S&I</SERVICE_TYPE>
        <SERVICE_VENDOR>Vendor4</SERVICE_VENDOR>
        <SERVICE_QTY>1</SERVICE_QTY>
        <SERVICE_COST/>
    </SERVICE>
</LIST_OF_SERVICES>
```

FIG. 5F

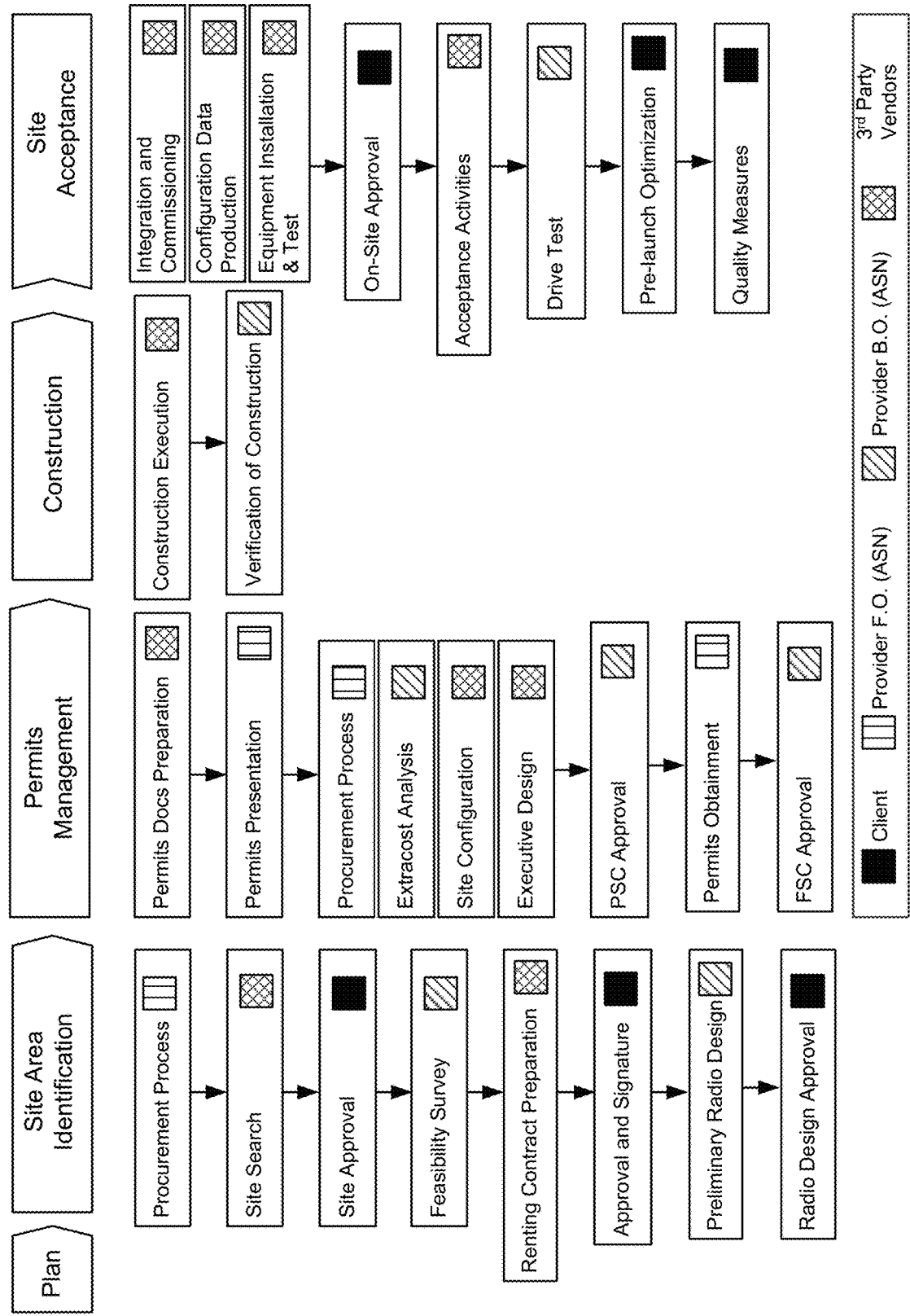
FIG. 7A  LTE SITE DEPLOYMENT

BACKHAULING FIBER OPTICS

Telco by accenture — Accenture Network Deployment Engine

File  Edit  View  Window  Help     Options ▼  New ▼

Bulk Actions | Work Item

Bulk Processing

| ☑ | ID | Urgency | Subject | Status | Instructions |
|---|---|---|---|---|---|
| ☑ | PM-390 | 10 | Permits Management | Pending-PermitsDocPreparation | Permits Document Preparation |
| ☑ | PM-391 | 10 | Permits Management | Pending-PermitsDocPreparation | Permits Document Preparation |
| ☑ | PM-399 | 60 | Permits Management | Pending-PermitsDocPreparation | Permits Document Preparation |

Transfer Assignment

Transfer to an operator ...or to a workbasket  [Select... ▼]

[Select...
ControllerProviderA
ControllerProviderB
Default@TelCo
ManagerClient
ManagerProviderA
ManagerProviderB
ManagerVendor1
ManagerVendor2
ManagerVendor3
ManagerVendor4
RegCoordinatorClient
RegCoordinatorProviderA]

Run in background? ☑

[ManagerVendor3]

[Process Selected Assignments]

FIG. 10C

| My Worklist | Site Area identification SAI-379 |
|---|---|
| 10 Site Search<br>SAI-362, Site Area Identification<br>Pending-SiteSearch | Site Search |
| 10 Site Search<br>SAI-361, Site Area Identification<br>Pending-SiteSearch | Site Search |
| 10 Site Search<br>SAI-358, Site Area Identification<br>Pending-SiteSearch | Owner            Third Party<br>Role               Regional Coordinator<br>Assign to       CoordinatorM@Vendor1.com<br>Provider        ProviderA |
| 10 Site Search<br>SAI-360, Site Area Identification<br>Pending-SiteSearch | Estimated Cost ($)   300<br>Actual Cost ($)      300<br>Commit Deadline    20-feb-2013 1:00 AM<br>Site ID               AG2341211 |
| 10 Site Search<br>SAI-379, Site Area Identification<br>Pending-SiteSearch | Site Name          Newark<br>Latitude/Longitude   40.748818,-74.170761 |
| 10 Site Search<br>SAI-357, Site Area Identification<br>Pending-SiteSearch | |
| 10 Site Search<br>SAI-359, Site Area Identification<br>Pending-SiteSearch | Show 40.748818,-74.170761 |
| | Submit    Save    Cancel |

Image of Site

FIG. 11C

NETWORK DEPLOYMENT FOR CELLULAR, BACKHAUL, FIBER OPTIC AND OTHER NETWORK INFRASTRUCTURE

The present application claims priority to U.S. provisional patent application Ser. No. 62/158,986, filed May 8, 2015, which is incorporated by reference in its entirety.

BACKGROUND

Mobile infrastructure is one of the largest segments in Carrier Network Infrastructure (CNI) and has become one of the biggest growth segments in the CNI. Although the highest growth for CNI may be mobile infrastructure, other segments are also experiencing growth, such as optical transports. Network service providers, such as cellular service providers, wireline service providers, cable service providers, satellite service providers, application-specific service providers, and other types of companies face great pressure to provide the best network service to their customers and to develop and deploy new services to the marketplace faster than their competitors. Furthermore, major telecommunication providers, cable network carriers and other types of service providers may have extremely large legacy networks in place, which may service thousands or millions of customers. The array of legacy products and services provided by these carriers can be large and complex. Also, the type of customers may be diverse, such as from individuals to large corporations.

To keep up with demand and to provide the level of service required by many customers, telecommunication providers are rolling out new infrastructures to handle increases in demand. For example, internet protocol (IP) and extremely high-capacity, fiber optic networks may be mandatory for providing the level of service required or desired by many customers. As a result, service providers may be faced with undergoing a comprehensive analysis to enable educated decisions for the rapid creation and deployment of telecommunication networks and services that meet their customer demands, minimize service disruption during rollout, and provide the highest quality of service within the customer demands. However, due to the cost, difficulty and know-how needed for undergoing such an analysis, many companies may fall short in their analysis, possibly resulting in failure to meet demand, failure to improve quality of service, and failure to timely provide improved capacity and services.

BRIEF DESCRIPTION OF DRAWINGS

The examples of the invention will be described in detail in the following description with reference to the following figures.

FIGS. 5B-F illustrate examples of code segments;

FIG. 7A shows an example of a process for a cellular site deployment;

FIGS. 10A-C illustrate examples of dashboard screenshots for a manager portal;

FIGS. 11A-C illustrate examples of screen shots generated by a mobile application and a screen shot of a site report.

DETAILED DESCRIPTION OF EMBODIMENTS

Figure 1:
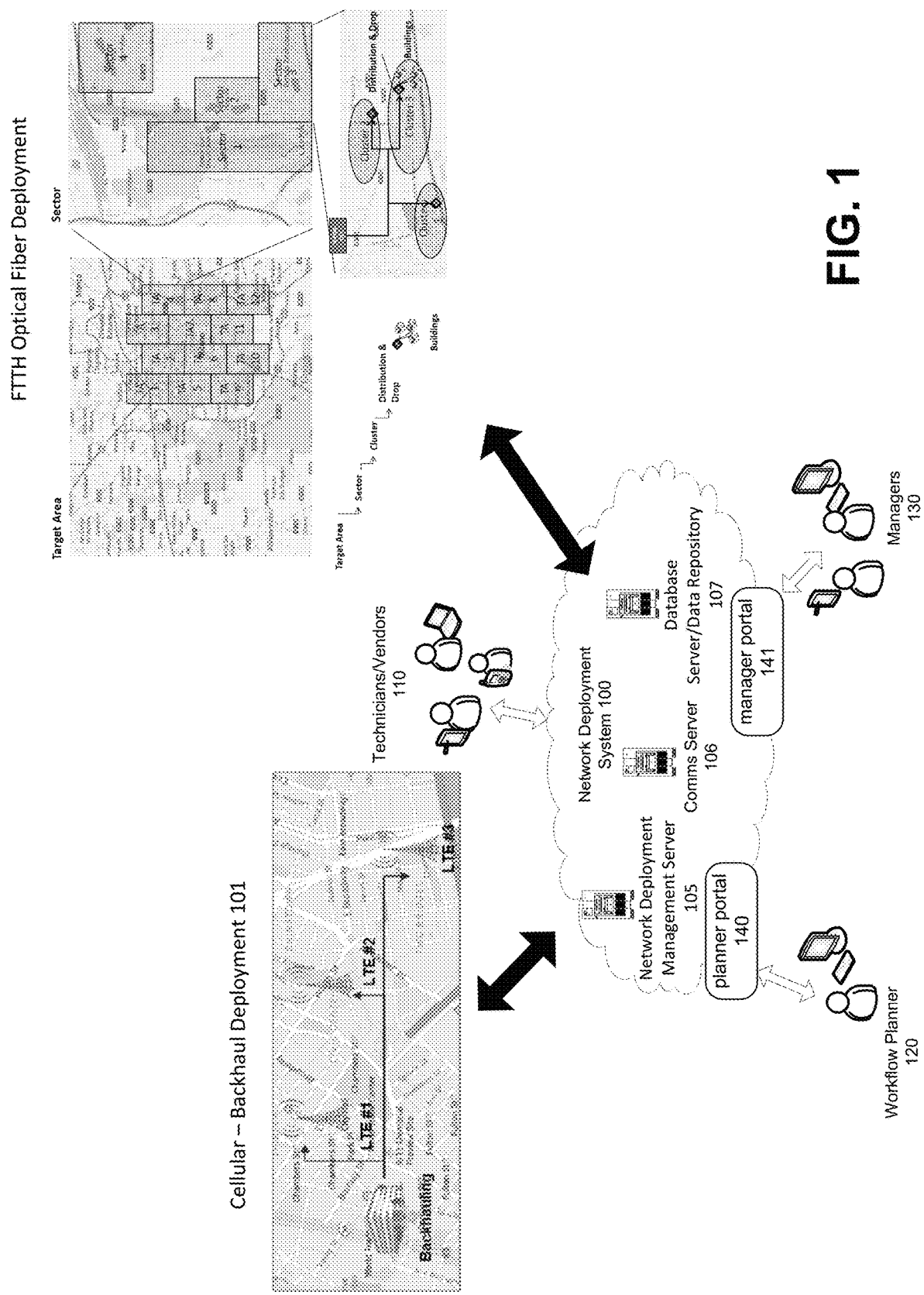
FIG. 1 illustrates a network deployment system, according to an example.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to the disclosed embodiments and examples, a network deployment system can provide end-to-end planning and deployment of network infrastructure. The network deployment system facilitates the orchestration and dependency handling of multiple network deployment processes across multiple regions and groups and for a variety of network technologies, including cellular, microwave, optical/fiber, etc.

According to an example, the network deployment system may facilitate deployment of cellular network infrastructure, including cellular network equipment for cellular sites and connection of the cellular sites to a backhaul network. A backhaul network includes network infrastructure that connects the cellular sites to a core network. For example, a backhaul portion of a network may include fiber and/or microwave network infrastructure that connects a cellular tower at a cellular site to the core network. The core network for example is the Internet service provider's network and may also be referred to as the backbone that carries packets for example from the cellular site to their destination which may include destinations on the Internet. A cellular site may be considered part of a subnetwork (subnet) that is connected to the core network via backhaul links. The backhaul network may connect any type of subnet (not just cellular) to the core network.

Network infrastructure refers to the hardware and software and equipment of a network that enables network connectivity, communication, operations and management of a network. Network infrastructure provides the communication path between users, applications, services and external networks which may include the Internet. Network infrastructure may include network hardware (e.g., routers, switches, network cards, wireless routers, cables, connectors, servers, etc.), network software (e.g., network operations and management, operating systems, firewall, network security applications, etc.) and communication mediums, such as fiber, copper, microwave, radio frequency, etc. and protocols.

According to another example, the network deployment system may facilitate the orchestration and dependency handling for deployment of fiber optic infrastructure, such as to provide fiber-to-the-home (FTTH) or fiber-to-the-node (FTTN). For example, the network deployment system may facilitate deployment of the horizontal optical network, such as from the telephone exchange to a quarter distributor, and deployment of vertical optical network, such as fiber to the home or node.

The network deployment system may be used for deploying any type of network infrastructure including but not limited to the cellular and fiber deployment examples described herein. For example, the network deployment system may be used for deploying wireless local area networks or other types of networks or any type of telecommunications network infrastructure.

FIG. 1 illustrates network deployment system 100 that facilitates network deployment. Examples of types of network infrastructure that may be deployed are shown in FIG. 1 and may include cellular and fiber networks. Although not shown, other types of networks and network infrastructure may be deployed by network deployment system 100.

According to an example, the network deployment system 100 may facilitate deployment of cellular network infrastructure, such as cellular sites. For example, as shown as 101 in FIG. 1, Long Term Evolution (LTE) cellular sites are deployed and connected to a backhaul network. The network deployment system 100 generates a workflow of processes to deploy the cellular network infrastructure. The processes are comprised of tasks. The tasks are actions and operations that are performed to deploy network infrastructure. For example, the processes may be for deploying cellular sites and connecting the cellular sites to the backhaul network. The processes may include tasks for cell site area planning and identification, construction, installation, configuration, testing, etc. Examples of tasks are further described below but tasks and processes for workflows may include tasks and processes other than described herein. The workflow may include a chronological order to execute the tasks of the processes, and may be based on workflow parameters and dependencies between tasks as is further described below.

The network deployment system 100 may be used to deploy fiber optic networks, according to another example. For example, the network deployment system 100 may generate a workflow to deploy a FTTH optical network, such as shown as 102 in FIG. 1. Some examples of tasks that may be included in the workflow include identifying the target geographic areas to be covered by the optical fiber, deploying the fiber optic network infrastructure from the central office to Optical Network Terminals (ONTs), and deploying fiber to the customer premises.

The network deployment system 100 may be executed by one or more servers. For example, servers 105-107 are shown but the system 100 may be implemented by one server or two or more servers or other types of computer systems. The servers 105-107 may be connected with each other through a network or a bus or another communications medium.

Communications server 106 includes one or more interfaces to communicate with devices and systems, including internal and external systems. Internal systems may include systems that are part of the same enterprise or organization. For example, the internal systems may be enterprise applications, such as human resource and billing applications, for the network service provider. The communications server 106 may include application program interfaces (APIs) to communicate with the internal systems. The external systems may include devices and systems outside the enterprise or organization.

According to an example, the communications server 106 may provide web portals for devices to access the network deployment system 100. The web portals may be accessible from multiple platforms, such as personal computers, smartphones, tablets, etc., and may be accessible via the Internet. Also, the web portals may display information through graphical user interfaces (GUIs), such as dashboards, that allows users to enter information. The web portals are capable of presenting information based on the category or role of the user. For example, a planner portal 140 provides planning information for generating a workflow, and a manager portal 141 provides information for a manger to perform network deployment tasks and make network deployment decisions and execute workflow modifications after the workflow is generated, as is further described below. Although not shown, a web portal may be provided for technicians or the technician may have a mobile device with a mobile application to perform network deployment tasks. The web portals may have the same look and feel but display information that is specific to the user and/or specific to the role of the user. The communications server 106 may include a web server including a full-featured web services library to support the web portals and to support access by different types of devices. APIs and other communication protocols and mechanisms may also be used to communicate with external systems.

In one example, the network deployment system 100 may be provided by internal servers, such as servers 105-107, storing and executing machine readable instructions and storing data for the network deployment system 100. In another example, the network deployment system 100 may be provided as an external service, such as a cloud service, used by a network provider, but external to the network provider. In this example, the internal systems of the network provider may be accessed as external systems to the network deployment system.

The database server 107 may include one or more databases, comprised of tables, to store any data used by the network deployment system 100. The database tables may store information for creating and executing workflows, and information for managing workflows, as is further described below. The database server 107 may execute queries to retrieve desired information from the tables. The network deployment system 100 may use any type of storage system, including storage systems other than relational databases, to store and retrieve data used by the network deployment system 100. The data storage of the network deployment system 100 may be a data repository comprised of one or more types of storage systems, including a database.

The network deployment management server 105 generates the workflow for network deployment based on workflow parameters and executes the workflow. The workflow may be generated based on workflow parameters received from a workflow planner individual 120. A network provider deploying network infrastructure determines parameters for network deployment in terms of network traffic and capacity (e.g., bandwidth), quality of service (QoS), and other parameters. Furthermore, the network provider may be migrating to a new target infrastructure or updating an existing infrastructure. Accordingly, the requirements of existing network services and new network services must be determined or estimated so those requirements can be met by the new or updated infrastructure. The workflow planner 120 may input one or more of these requirements to generate the workflow for the network deployment.

The network deployment system 100 may store a library of code segments representing elementary network deployment tasks. For example, the code segments may be designed to cover the most common tasks, and may be configured for the context of a network deployment, such as in terms of network size, network services, etc. In this way, the time to build a workflow and effort needed to create the workflow is decreased and simplified by selecting existing code segments and modifying them if needed for the context. For example, the network deployment manager server 105 may retrieve code segments representing tasks for the workflow from the database server 107 or another data storage. The code segments represent tasks to complete for deploying the network. The code segments may be modified as needed by the workflow planner 120 or another user, for example, through a GUI presented in the planner portal 140. Also, through the GUI, a new workflow may be created based on existing processes or workflows that are stored in the system 100.

Once the tasks for the workflow are selected or created, the network deployment management server 105 links the tasks together to create the workflow based on a specified order and dependencies. The code segments representing the tasks may be linked together from a temporal point of view, so as to specify a chronological order to complete the tasks and to facilitate generating and managing a schedule to complete the tasks, processes, and the overall network deployment. Accordingly, the workflow includes an order of execution of the tasks (sequential and/or parallel). The workflow may include multiple paths, and the opportunity to travel a certain path depends on the occurrence of certain conditions (such as errors or responses) that are detected. Some of the tasks may include approval, request, notification, design and order.

In an example, the workflow planner 120 inputs an overall project deadline, and the network deployment manager 105 automatically and retroactively calculates deadlines of each task by subtracting the durations for each task (which may be determined from average task durations determined from duration information stored in the database server 107). The tasks may be configured based on the particular context of the project (e.g., geography, and other conditions). The workflow planner 120 is allowed to confirm or to change the deadlines. A planning view of the workflow may be generated in the planning portal 140 and provides a dynamic and real-time recap overview of deadlines in a way that if the user changes one deadline, then the other deadlines of other tasks are updated accordingly and displayed in real-time. The information provided in each code segment associated with a task may include a user assigned to each task, a cost of each task, deadline for each task, company, and other metadata. This information may be viewed through the planner portal 140 and revised in a planning phase to generate the workflow. A planning overview may also be shown with a deadline, budget and other information.

Also, the network deployment management server 105 can simulate workflows to determine the best combination of resources to meet time constraints and other constraints. For each simulation, the network deployment management server 105 receives input parameters, such as information about resources to perform each workflow task. If the task requires human interaction, the resources may include vendors, technicians, or other individuals that are performing the task and information about the resources, such as the average time to complete the task. The simulation generates forecasts for a workflow, such as a time forecast to complete each task and to complete the entire workflow. Different resources and information for each resources may be substituted to run different simulations to identify the workflow that meets time and other requirements (such as cost) for the overall network deployment. A selected workflow may be saved and implemented.

The workflow generation performed by the network deployment system 100 may include selection of vendors to perform tasks. Also, task assignments may be determined based on roles. For example, if the task is associated with a managerial role, the task is assigned to one of the managers 130, and similarly, tasks may be assigned to technicians and vendors 110. Vendors may include technicians or other service providers that are not part of the network provider. Vendor lists may be maintained and classified by operating region, the respective activities the vendors can perform, and the price for performing each activity. A set of tables in the database server 107 may store the vendor lists, for each geography, and may specify the tasks that each vendor is authorized to perform, the cost for each task, duration, average delay, and other parameters for each vendor. The network deployment management server 105 can retrieve information from the tables to determine workload of the resources select the most appropriate vendor and assign relevant tasks to the most appropriate vendor to create the workflow. When the workflow is executed and the resources are performing the tasks specified in the workflow, the network deployment system 100 can generated role-based GUIs for the technicians and vendors 110, the workflow planner 120 and the managers 130 that include information specific to the role and pertaining to the execution and/or modification of the workflow.

Also, the network deployment management server 105 includes the ability to control a workflow when it is executed for network deployment based on technology dependencies and other requirements for the network deployment. For example, a complex network deployment may involves multiple sites and multiple services. In a typical scenario, several deployment processes may need to be executed in synchronization. For example, the LTE site deployment at 101 shown in FIG. 1 requires connection to the backhaul network by a backhaul process. Workflow determination performed by the network deployment system 100 determines the dependencies between LTE site deployment processes and backhauling processes, and generates the workflow specifying a chronological order of performing network infrastructure deployment tasks and executing network deployment tasks based on the technology dependencies. Additionally, the network deployment system 100 may calculate deadlines and costs for all the network deployment processes taking into consideration the dependencies, and further updating the workflow in real-time based on delays. For example, network deployment management server 105 detects a delay in the backhaul process and adjusts costs and deadlines that are dependent on the backhaul process being performed.

The network deployment system 100 can provide easy access to a holistic view of the execution of processes, sites status and other information associated with a workflow. Documents, such as notes, surveys, permits, maps, images, plans, etc. are managed as attachments to a process or a task in the workflow. Each operator, such as technicians/vendors 110, workflow planner 120 and managers 130, can upload documents to the network deployment system 100 and the documents are stored in the data repository 107. The documents for example are uploaded via planner portal 140, manager portal 141, or a mobile application running on a mobile device. The documents are identified as being associated with a particular process or task and the association is also stored in the data repository 107 with the documents.

Users that are associated with the process or task are may be given access to the documents for the process or task. For example, a technician logs into the network deployment system 100 via a portal or mobile application, and the network deployment system 100 determines which tasks or processes are associated with the technician, and the technician may access the documents for their tasks or processes. For example, the mobile application may download the documents for display to the user via the mobile application. In an example, the mobile application displays a map with directions to a site that is for a site task to be performed by the technician. The technician takes pictures of the site and uploads the pictures to the network deployment system 100, and the network deployment system 100 stores the pictures and associates the pictures with the site task. A manager that is responsible for overseeing the task can also access and view the pictures for example via the manager portal 141. Also, the documents may be associated with categories, such as map, site pictures, plans, etc. Different processes, including parent and child processes, may have different categories. The documents may be displayed for a category if the category of documents is selected for display for a process or task.

Figure 2:
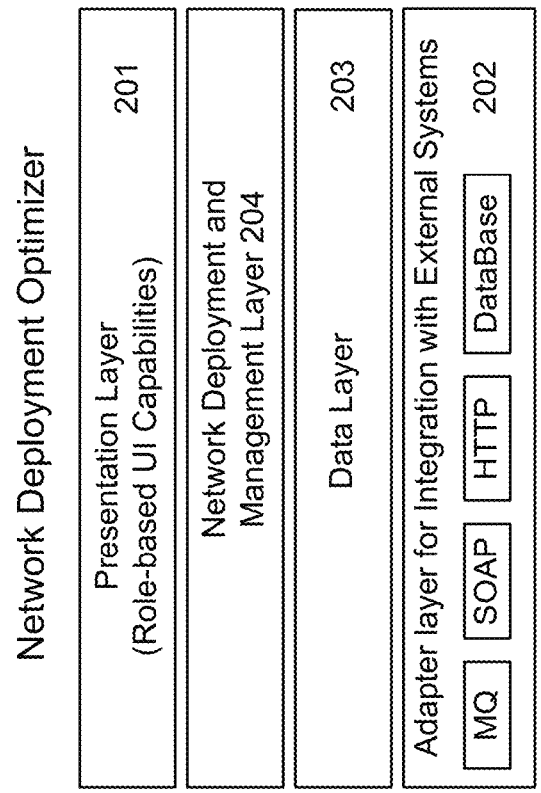
FIG. 2 illustrates a software architecture for the network deployment system, according to an example.

FIG. 2 shows an example of a software architecture 200 for the network deployment system 100. The network deployment system 100 can interface with multiple and different types of internal and external systems. Presentation layer 201 may generate GUIs, including role-based GUIs, for users accessing the network deployment system 100, such as described above with respect to planner portal 140 and manager portal 141 and are further described below. The presentation layer 201 may expose its own APIs to facilitate interfacing with other devices as a web service. Adapter layer 202 also interfaces with systems. For example, the adapter layer 202 implements different types of protocols, such as Simple Object Access Protocol (SOAP), Hypertext Transfer Protocol (HTTP), Extensible Markup Language (XML) and proprietary messaging and communications protocols. These protocols and/or APIs may be used to interface with various internal or external systems, such as a document management system, a map application (e.g., GOOGLE MAPS) or other applications, mail server, workforce management system, Enterprise Resource Planning (ERP) system, inventory system, etc.

The layers 201 and 202 can provide data collection from the internal and external systems. Furthermore, the layers 201 and 202 and/or data layer 203 may normalize the data for storage in the database server 107. Normalizing may include formatting data according to predetermined schemas. For example, one or more of the layers 201-203 map the received data to schemas of data structures, which may include database tables in the database server 107, based on the determined types and fields. The received data may include any data received from data sources, which may include internal or external systems. For example, information for vendors may be received, formatted and stored in database tables. The data stored in the database tables in the database server 107 can be queried as needed. The data layer 203 performs the operations for storing and retrieving data from the database tables. The data layer 203 may include a database management system that understands a query language and converts it to a computer readable form and executes it to retrieve the results from the database tables.

Network deployment management layer 204 performs the operations described above with respect to the network deployment management server 105. The operations include but are not limited to workflow generation, workflow simulation, workflow execution and task dependency management, and vendor selection.

Figure 3:
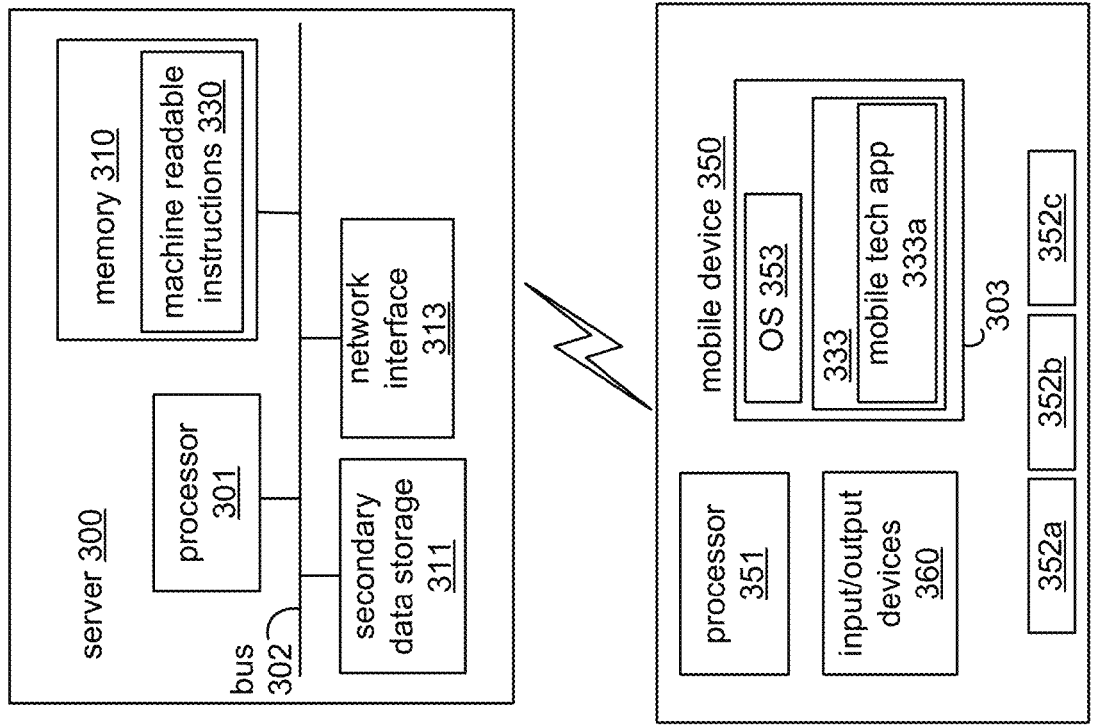
FIG. 3 illustrates a server and mobile device, according to an example.

FIG. 3 shows an example of a server 300 that may host one or more of the software layers shown in FIG. 2, and also shows a mobile device 350 that may be used by the technicians and vendors 110 or any user interacting with the system 100. The server 300 may be used for one or more of the servers 105-107. Hardware is shown for the server 300 which is a platform for executing one or more of the methods and functions and operations described herein, which may be embodied as machine readable instructions 330 (e.g., software) on one or more non-transitory computer readable storage mediums, such as memory 310. The server 300 may include one or more hardware processors, such as processor 301, that executes the machine readable instructions 330. In an example, the processor 301 may include a multi-core processor that can run multiple machine readable instructions at the same time. Other types of processors commonly used in servers may be used. The machine readable instructions 330 and data may be stored in the memory 310, such as a random access memory (RAM), during runtime, when the machine readable instructions 330 are executed by the processor 301. The secondary data storage 311, which may be non-volatile, can also store the machine readable instructions 330 and store data used by the server 300. A network interface 313 may be used to connect to other servers, mobile devices or other computer systems via a network. The network interface 313 may include a wired and/or wireless network interface, such as for Ethernet or Wi-Fi. Although not shown, the server 300 may include other communication interfaces, such as for Bluetooth and/or near field communication (NFC).

The server 300 may connect to other servers or other computers via a network. For example, the server 300 may connect to mobile device 350 which hosts one or more mobile applications 333, including a mobile application for connecting to the network deployment system 100 and for performing operations related to the network deployment system 100, as is further describe below. The mobile device 350 includes a processor 351 and data storage 303. The processor 350 for example is an integrated circuit. The processor 350 may be a chipset with central processing unit and/or custom processing circuits, such as an application-specific integrated circuit (ASIC) or field-programmable gate array (FPGA). The processor 350 may host and execute an operating system (OS) 353 and the mobile applications 333. The OS 353 and the mobile applications 333 are stored in data storage 303 which is a non-transitory computer readable medium. The mobile applications 333 may include mobile tech app 333a which may be used by the vendors and technicians 110 in the field and is further described below with respect to FIG. 7A. The mobile device 350 includes input/output (I/O) devices 360, such as keyboard, touch screen display, speaker, etc. The I/O devices 360 may provide audio, visual and/or tactile output and allow a user to enter information into the mobile device 350. The mobile device 350 may include one or more interfaces 352, wired or wireless, for communicating with other devices. For example, interface 352a may be a cellular interface, interface 352b may be a Wi-Fi interface, and interface 352c may be a Bluetooth or NFC interface. The interfaces 352 may include a wired interface, such as a Universal Serial Bus interface.

Figure 4:
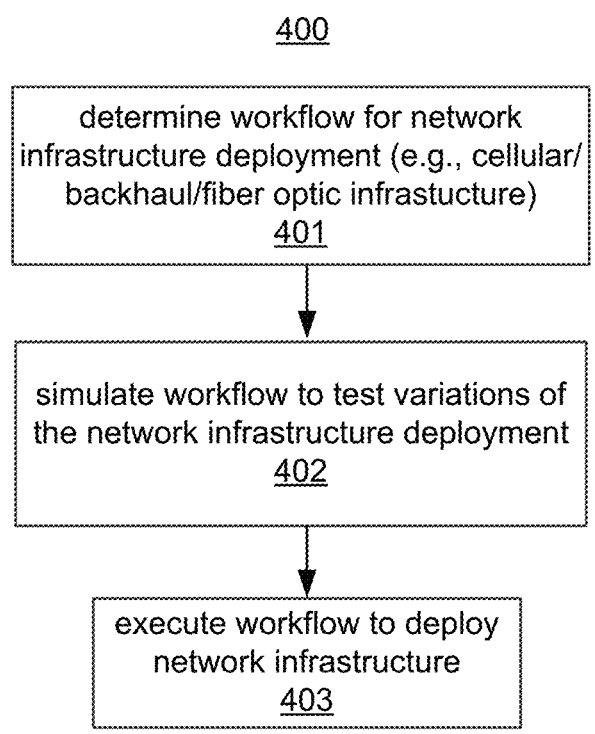
FIG. 4 illustrates a method, according to an example.

FIG. 4 illustrates a method 400 which may be performed by the network deployment system 100. The method 400 and other methods described below may include steps performed by the network deployment management server 105 and/or the servers 106-107, by way of example. The method 400 and other methods described below may be performed by other computers and systems. Furthermore, the method 400 and other methods described below may be embodied as machine readable instructions executable by a processor to perform the steps of the methods.

At 401, a workflow of processes for deploying network infrastructure is determined. The workflow may include a chronological order to execute the tasks in the processes for deploying the network infrastructure. The workflow may be generated based on workflow parameters associated with the network infrastructure and deploying the network infrastructure. Examples of the workflow parameters may include infrastructure capacity, network performance, task completion deadlines, vendor or technician assignment, budget or cost, etc. In an example, the workflow includes processes for deploying cellular network infrastructure and connecting the cellular infrastructure to a backhaul network. In another example, the workflow includes processes for deploying fiber optic network infrastructure. Additionally, code segments may be used to generate the workflow. Examples of the workflow and generating the workflow are further described with respect to FIG. 5A.

At 402, after the workflow is generated, the workflow may be simulated to test variations of the network infrastructure deployment. For example, the network deployment system 100 determines a variation for at least one task in the workflow, and regenerates the workflow based on the variation. Examples of variations may include a change of network equipment, change of network equipment configuration, change of a deadline, a change of a vendor assigned to a task, a change to a budget or change in costs, a change of a dependency between tasks in the workflow, addition of a new task, removal of a task, etc. The variation may be entered by a user, such as the workflow planner 120, via a GUI. The network deployment system 100 regenerates the workflow based on the variation. One or more workflows may be generated through the simulation process to evaluate different workflows generated based on different variations. The generated workflows are displayed to the user, and the user may select one of the workflows to execute that satisfy conditions, such as related to network performance, deadlines, costs, etc. The simulation is optional and the workflow generated at 401 may be executed without simulating variations.

At 403, the workflow, such as determined at 401 or 402, is executed to deploy the network infrastructure. Executing the workflow includes executing the code segments associated with each task in the workflow in the chronological order specified in the workflow and based on dependencies between tasks specified in the workflow. The code segments capture metrics including information for the processes of the workflow and updating the workflow based on the captured metrics and information.

Figure 5A:
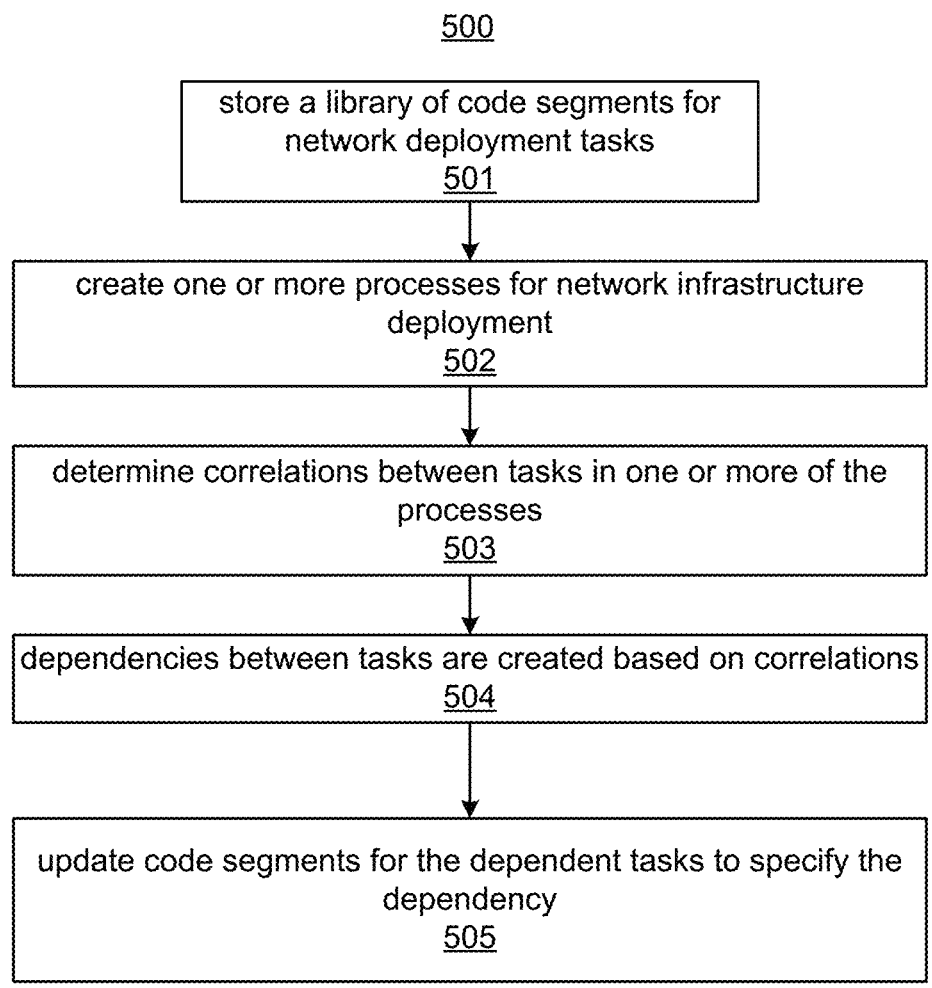
FIG. 5A illustrates a methods, according to another example.

FIG. 5A illustrates a method 500 for generating a workflow to deploy network infrastructure. At 501, a library of code segments are stored for example in the database server 107 or another data repository of the network deployment system 100. As discussed above, code segments are created for network deployment tasks, and may be reused. In this way, the time to build a workflow and effort needed to create the workflow is decreased and simplified by reuse of code segments.

A code segment is reusable code including workflow parameters for an associated network deployment task. The code segment may be written in HTML, XML, or any commonly used computer language. Scripts, such as Common Gateway Interface (CGI) scripts, may be generated to execute the workflow (i.e., execute the code segments).

FIGS. 5B-5F show examples of code segments in XML. FIG. 5B shows a header of a code segment, and shows information that may be included in the body of the code segment. The information may include a code segment instance ID that may be used to identify the code segment from the library. Other information that may be instantiated in the code segment includes program name, project name, subproject name, relevant dates, costs, etc. FIG. 5C shows an example of a code segment for a procurement process task. Examples of information that may be included in this code segment may include task name, task code describing the actions or operations to be performed for the task, dates, owner type vendor, task owner, equipment and services procured for the network deployment, etc. FIG. 5D shows an example of a code segment for a preliminary radio design task. Examples of information that may be included in this code segment may include task name, task code describing the actions or operations to be performed for the task, dates, owner type vendor, task owner, equipment and services used for the radio design, etc. FIG. 5E illustrates an example of a code segment for an approval task. Although not shown, the code segment could be instantiated with details for equipment and services that are associated with the approval that is needed. FIG. 5F illustrates an example of a code segment for equipment installation and testing. The examples in FIGS. 5B-F may be used for tasks shown in FIG. 7. Furthermore, these examples are non-limiting, and the codes segments may include other information, and the library may include code segments for other tasks and processes.

Figure 6:
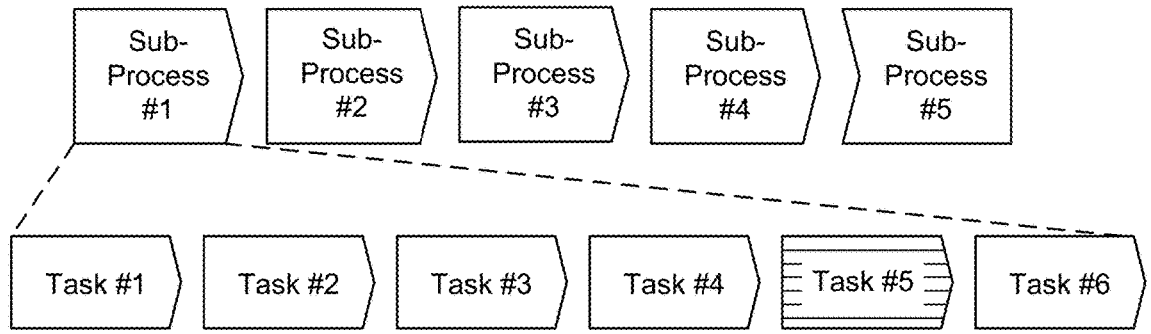
FIG. 6 shows an example of a process for a network infrastructure deployment workflow.

At 502 in FIG. 5B, a process for network infrastructure deployment is created based on tasks and their code segments. One or more processes may be created at 502. A structure of a process is shown in FIG. 6. A process may be logically divided into sub-processes, such as sub-processes 1-5, which may represent categories of tasks. Tasks 1-5 are included in sub-process 1. Tasks may be specified for each sub-process by the workflow planner 120 along with the order for performing each of the tasks in each sub-process. Each sub-process includes tasks that may be linked to other tasks, which may be in the same process, other sub-processes and/or other processes. The code segments for the tasks include workflow parameters that specify the order of execution for the tasks. For example, the tasks are linked according to the chronological order in which the tasks are to be performed, and the code segments or metadata for the tasks, sub-processes and/or process specify the order for performing the tasks.

In an example, the network deployment server 105 determines code segments for tasks to include in the workflow. For example, during a workflow planning phase, the workflow planner 120 accesses the network deployment management system 100, such as through planner portal 120, and generates and/or selects code segments from the code segment library in the database server 107 that represent tasks to include in the process. The selected code segments are stored for example in a workflow planner folder for the network deployment. Code segments may be modified as needed by the workflow planner 120 or created for a specific task. Also, the workflow planner may specify the tasks for each sub-process and the order of execution. The process that is created may be the workflow, or the process may be linked to other processes through dependencies to create the workflow, as is described below. For example, multiple processes may be created and linked through a dependency to create a workflow comprises of multiple processes.

Figure 7B:
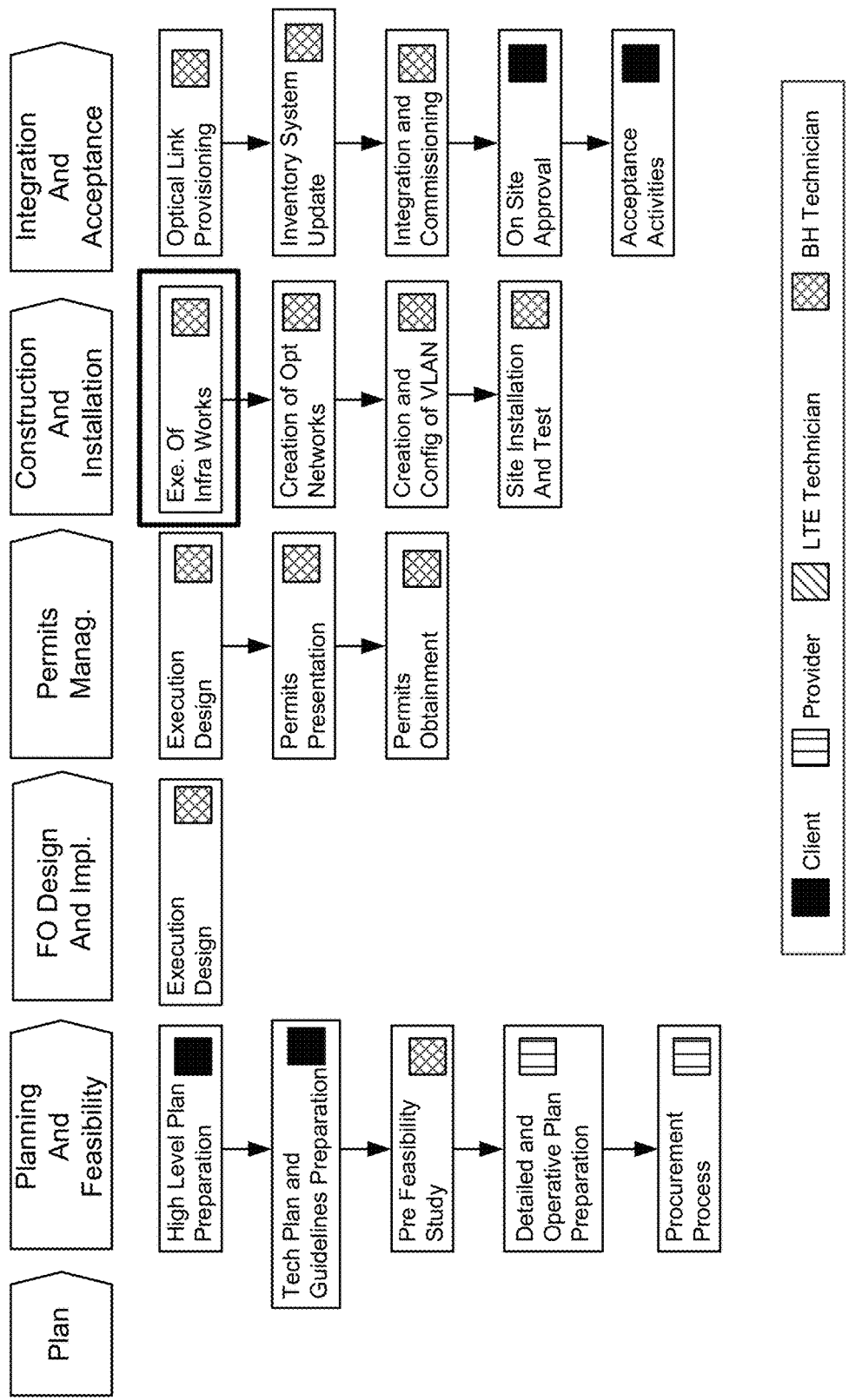
FIG. 7B shows an example of a process for backhauling.

FIG. 7A shows an example of a process for LTE site deployment. The process is comprised of sub-processes 1-4 for site area identification, permits management, construction, and site acceptance. For site area identification, examples of tasks are shown as 1.1-1.8. Similarly, tasks are shown for each of the other sub-processes. Code segments are selected or generated for each of the tasks of the sub-processes. FIG. 7B shows an example of a process for backhauling. The process is comprised of sub-processes 1-5 for planning and feasibility, FO (fiber optic) design and implementation, permits management, construction and installation, and integration and acceptance. Examples of tasks are shown for each sub-process. Code segments are selected or generated for each of the tasks of the processes. The processes shown in FIGS. 7A-B may be linked and form a single workflow for deploying and backhauling LTE sites.

Figure 7C:
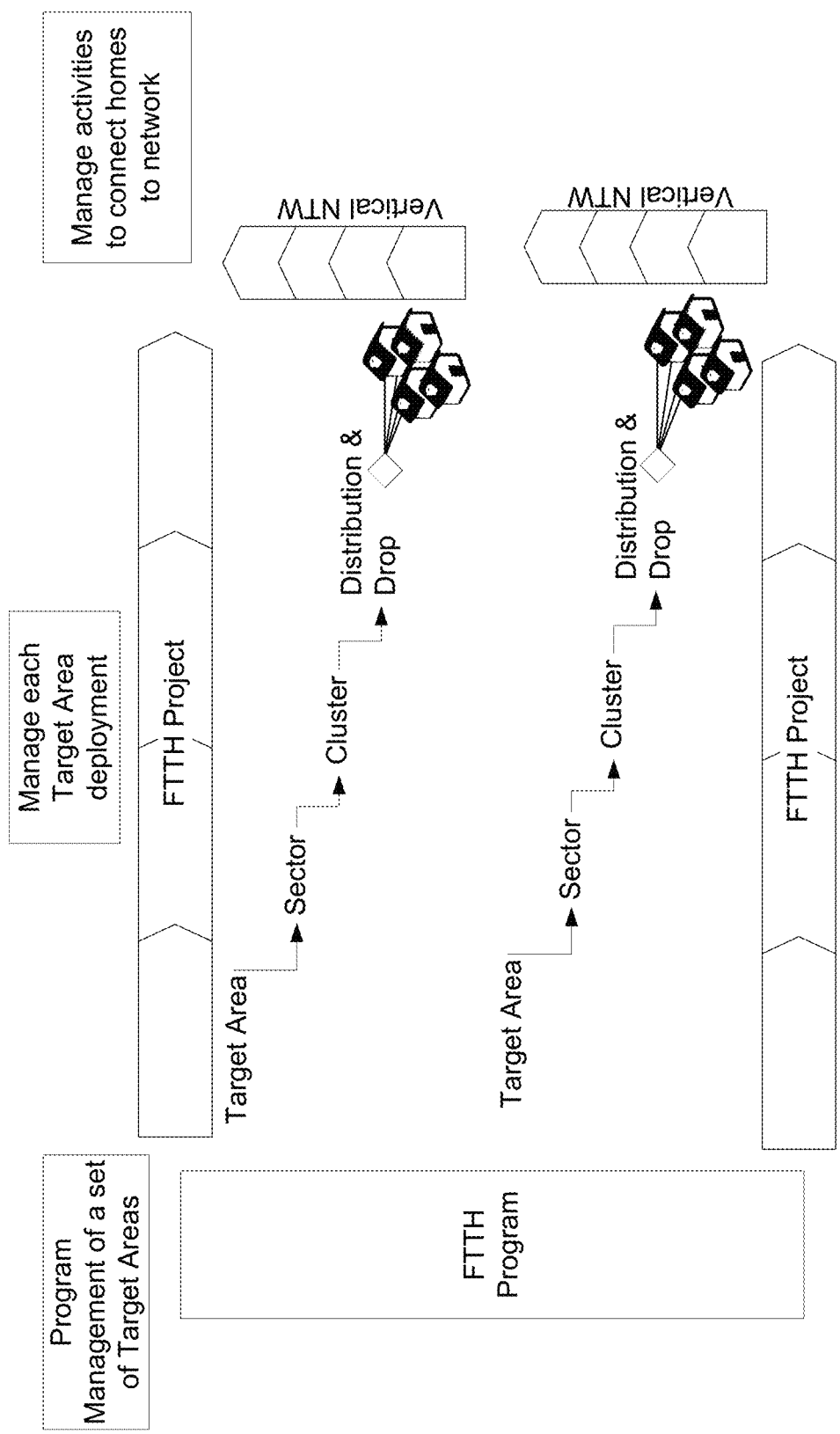
FIG. 7C shows an example of processes for a fiber-to-the-home network deployment.

FIG. 7C shows an example of processes for an FTTH network deployment. The network provider for example defines the geographic target areas for deploying the new FTTH networks. Within the target areas, "n" different processes and/or workflows for different projects can be generated to manage a target area. The processes may include tasks for managing the deployment at the sector, cluster and at the drops. Also, the tasks may include tasks for connecting each customer premises to the drop, which are referred to as the vertical tasks. The same steps are performed for the fiber deployment as the cellular site deployment. For example, in a planning view the code segments are determined for a fiber deployment process and the code segments are instantiated with workflow parameters, such as geographic location, task information, deadlines, costs, task owner, vendor assignment, etc.

Referring back to FIG. 5A, at 503, the network deployment server 105 determines correlations between tasks in one or more of the processes. The correlations may be input by the workflow planner 120 and identify dependencies between tasks. A dependency may include that a task that must be executed prior to executing another task. In an example, a dependency may be between a task in a process for deploying cellular network infrastructure, and a task in a process for backhauling.

Figure 8:
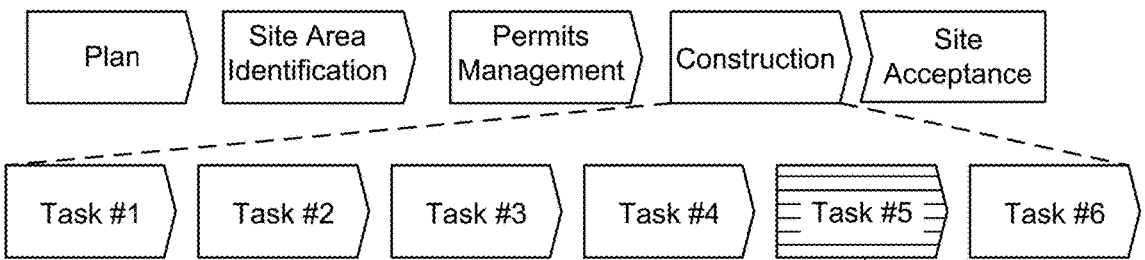
FIG. 8 illustrates an example of creating dependencies between tasks for network deployment.
Figure 8:
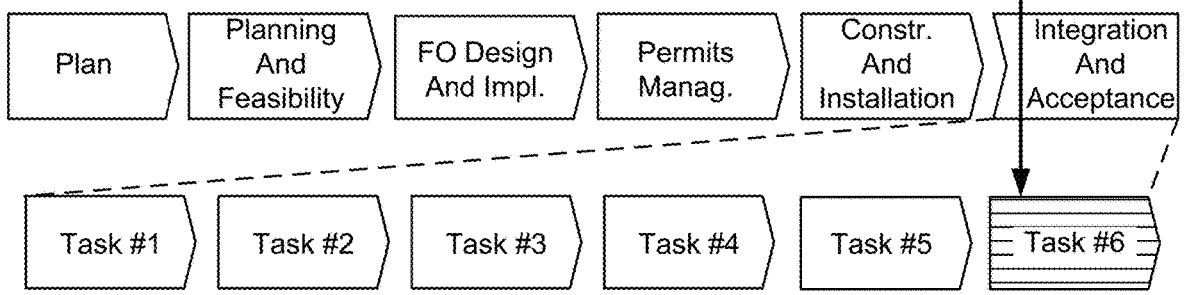

At 504, dependencies between tasks are created based on the correlations. The dependencies may be created by linking code segments that are associated with the tasks that are determined to be dependent based on the correlations. FIG. 8 illustrates creating dependencies between tasks for network deployment. A dependency for example is defined in terms of execution order. The dependency makes start of the execution of a task dependent on the completion of another process or task. FIG. 8 shows a dependency created between construction task 5 for LTE site deployment and integration and acceptance task 6 for backhauling. Construction task 5 and integration and acceptance task 6 are in different processes in this example, i.e., an LTE site deployment process and a backhauling process such as shown in FIGS. 6A-B. Also, the tasks are part of particular sub-processes. For example, construction task 5 is in the construction sub-process for the LTE site deployment process, and integration and acceptance task 6 is part of the integration and acceptance sub-process of the back-hauling process. In this example, the processes are linked to create a workflow for cellular site deployment by the dependency between tasks 5 and 6.

At 505, the code segments for the dependent tasks are updated to specify the dependency. In an example, e.g., through planner portal 140, the workflow planner 120 creates the dependency between the tasks by linking the tasks and specifying the chronological order for performing the tasks, e.g., task 6 cannot be performed unless task 5 is completed.

The dependency is instantiated in the code segment and stored on the database server 107. Instantiate means to include in the code segment. For example, the network deployment manager server 105 receives the dependency information entered by the workflow planner 120 that identifies the dependent tasks and the dependent order for performing the tasks. The network deployment manager server 105 generates a dependency identifier for the tasks and includes it in the code segments for the tasks. The network deployment manager server 105 stores the dependency identifier and the order for performing the tasks in a tracking table in the database server 107. When the code segments for the dependent tasks are executed, the network deployment manager server 105 identifies the dependency identifier in task 5, searches the tracking table with the dependency identifier, and identifies the order for performing the dependent tasks 5 and 6. From this point onward it will not be possible to proceed with the execution of the task 6 where dependency is set unless all dependent links are resolved, which means unless all dependent tasks or projects are completed. For example, it will not be possible to proceed with the execution of task 6 unless task 5 is completed.

After the processes are determined for the workflow and the dependencies are determined and instantiated in the code segments, the result is a workflow that is created with a chronological order for executing the tasks. The chronological order for executing the tasks is programmed in the workflow. For example, the processes in the workflow include links between the tasks in each workflow that specify order of execution of the tasks, such as shown in FIGS. 6-8. Furthermore, the dependencies are also programmed in the code segments, for example, using the dependency identifiers. If a dependency identifier is encountered during the execution of a process, the network deployment management server 105 diverges execution from the process according to the dependent tasks, such as shown in FIG. 8.

Figure 9:
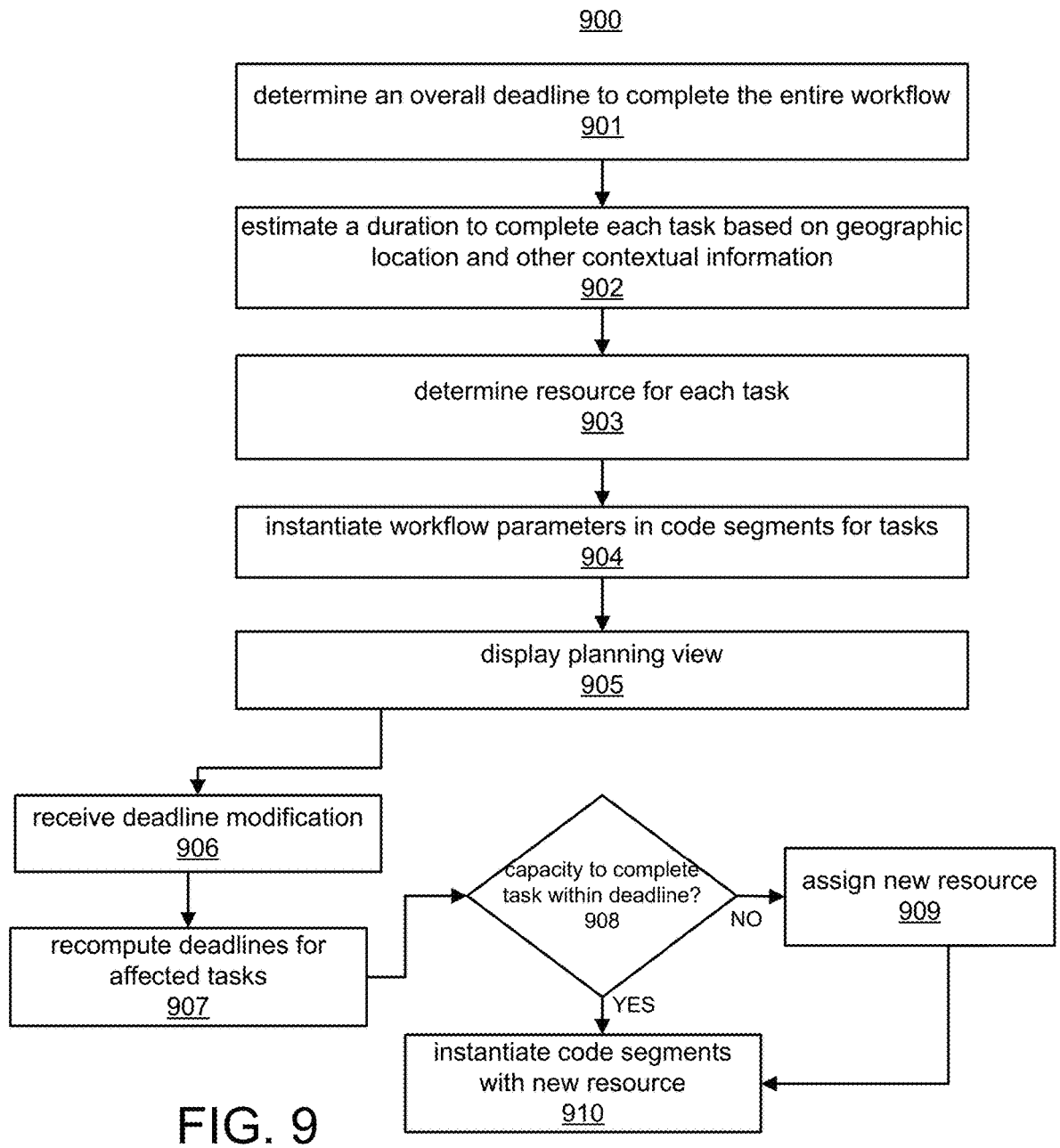
FIG. 9 illustrates a method, according to an example.

The network deployment management server 105 can generate a planning view for a workflow that shows a recap. For example, for each task, the assignment, owner, company, cost, deadline and other workflow parameters, which are proposed to the user, such as the workflow planner 120, are shown in the planning view. FIG. 9 shows a method for determining workflow parameters in the planning or generation phase of the workflow. Assume a workflow is generated that includes the LTE and backhauling processes shown in FIG. 8. A method 900 shown in FIG. 9 includes steps for determining workflow parameters, including deadlines and owners for the tasks. The owners may be vendors or technicians or any person responsible for performance of a task, including tasks performed by devices, test equipment, computer systems, etc., and/or tasks performed by individuals. At 901, the network deployment management server 105 determines an overall deadline to complete the entire workflow, i.e., the entire network infrastructure deployment. The overall deadline may be provided by the workflow planner 120.

At 902, the network deployment management server 105 estimates a duration to complete each task based on geographic location and other contextual information. For example, database tables in the database server 107 store information about common network deployment tasks based on geography. The network deployment management server 105 automatically backward calculates deadlines of each task by subtracting the typical durations configured for each task stored within database tables or calculates the deadlines based on historical information applied to the particular context where the project is created (geographic location and other conditions).

At 903, a resource for each task is determined. A resource may be an individual and/or computer, device, network equipment, etc., that performs the task. The database server 107 stores a resource table that identifies resources for tasks, and for each resource, capacity, duration or average duration to complete the task. The resources may be task owners comprised of vendors, and the database tables may store the vendors for each geographic location, which tasks they are allowed to perform, what is the cost for each task, duration, average delay, etc. The network deployment management server 105 queries the database tables to determine the most appropriate task owner, which may be a vendor, based on the task deadline, costs, budget, etc.

At 904, the workflow parameters are instantiated in each of the code segments for the tasks. The workflow parameters may include but are not limited to the resource, which may include the task owner, assigned to the task, deadline to complete the task, cost to complete the task, etc. At 905, the network deployment management server 105 displays a planning view e.g., via the planner portal 140, which shows the workflow, the tasks and the workflow parameters, including deadline and assigned resource. At 906, the network deployment management server 105 may receive a modification, e.g., from the workflow planner 120 via the planner portal 140, to a deadline. At 907, the network deployment management server 105 re-computes the deadlines of any tasks affected by the modified deadline or the modified resource. At 908, the network deployment management server 105 determines whether the assigned resources of the tasks with the modified deadlines have the capacity to complete the task within the deadline. For example, if the duration of the task duration of the current owner of the task as determined from the database tables is such that the task cannot be completed by the deadline, then a new resource is proposed or assigned that can complete the task within the deadline at 909. At 910, the newly assigned resources are instantiated in the code segments for the associated tasks.

Once the workflow is created and the workflow parameters are determined for the tasks, the workflow is executed. To execute the workflow, the network deployment management server 105 determines workflow parameters and chronological order for executing the tasks from the code segments for the tasks. The network deployment management server 105 schedule tasks with the task owners, notifies when a task is to be completed according to the chronological order of the tasks in the workflow, generates alerts when there is a delay in the tasks, adjusts deadlines when tasks are delayed, and displays the adjusted deadlines. The network deployment system 100 provides real-time deployment and performance monitoring, vendor control and management through key performance indicator tracking and automated adjustment of vendors and deadlines in response to delays and other detected conditions during the network infrastructure deployment, Some examples of workflow execution are described focusing on a subset of tasks related to LTE site deployment and actions performed by the task owners. Similar operations may be performed for fiber network infrastructure deployment or for other types of network deployment. For example, the managers 130 monitor and approve tasks, and the network deployment system 100 provides the managers 130 with access to reports and relevant information to immediately analyze inefficiency, delays, costs and other workflow parameters via the manager portal. For example, a manager accesses the network deployment system 100 through the manager portal 141 to real-time check and track cost overages and delays from a dashboard presented in the manager portal. The manager may determine that a vendor or technician of the technicians/vendors 110 is not performing as expected, the manager may reassign the vendor's tasks to another vendor via the manager portal 141.

Figure 10A:
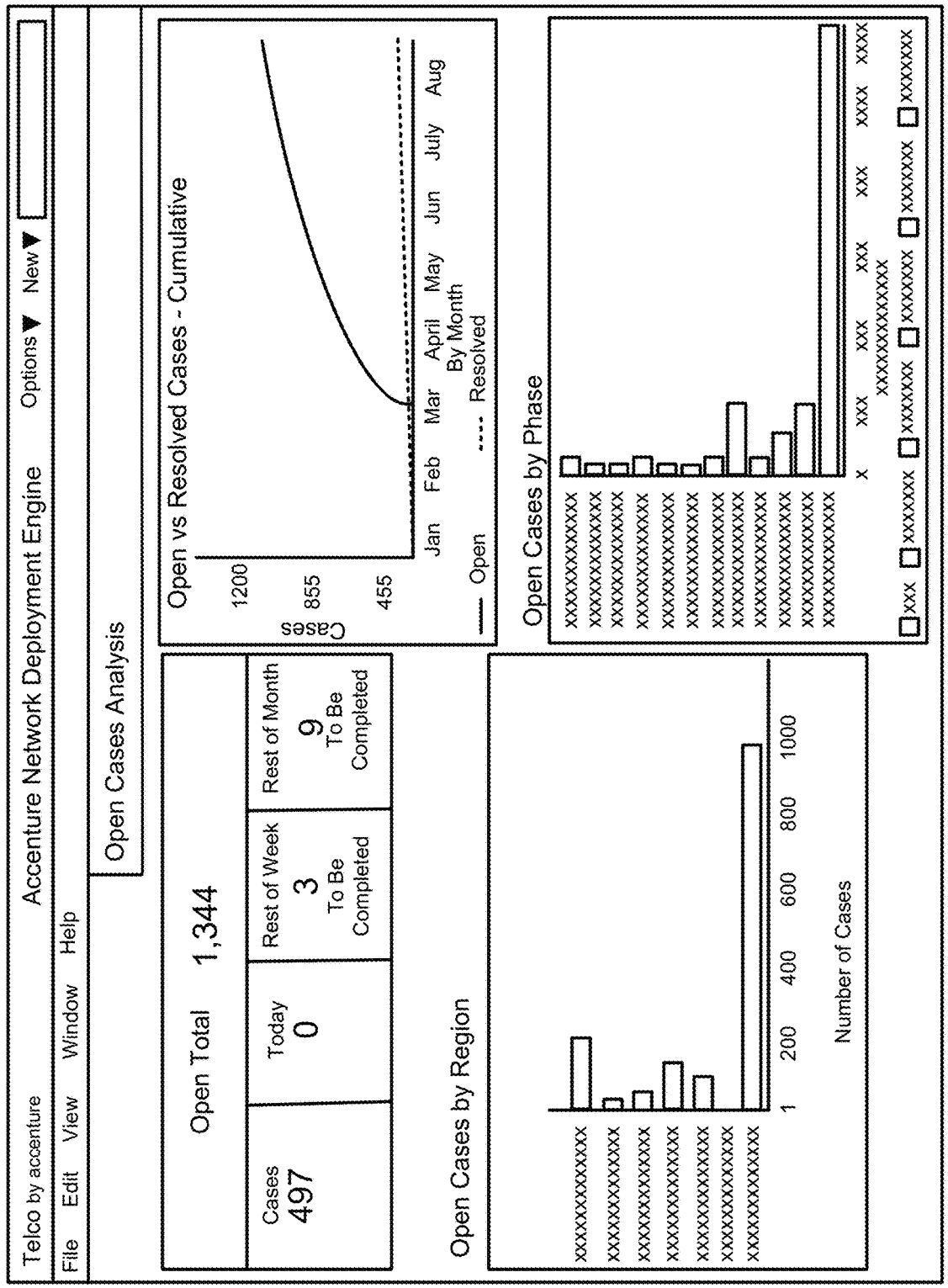
Figure 10B:
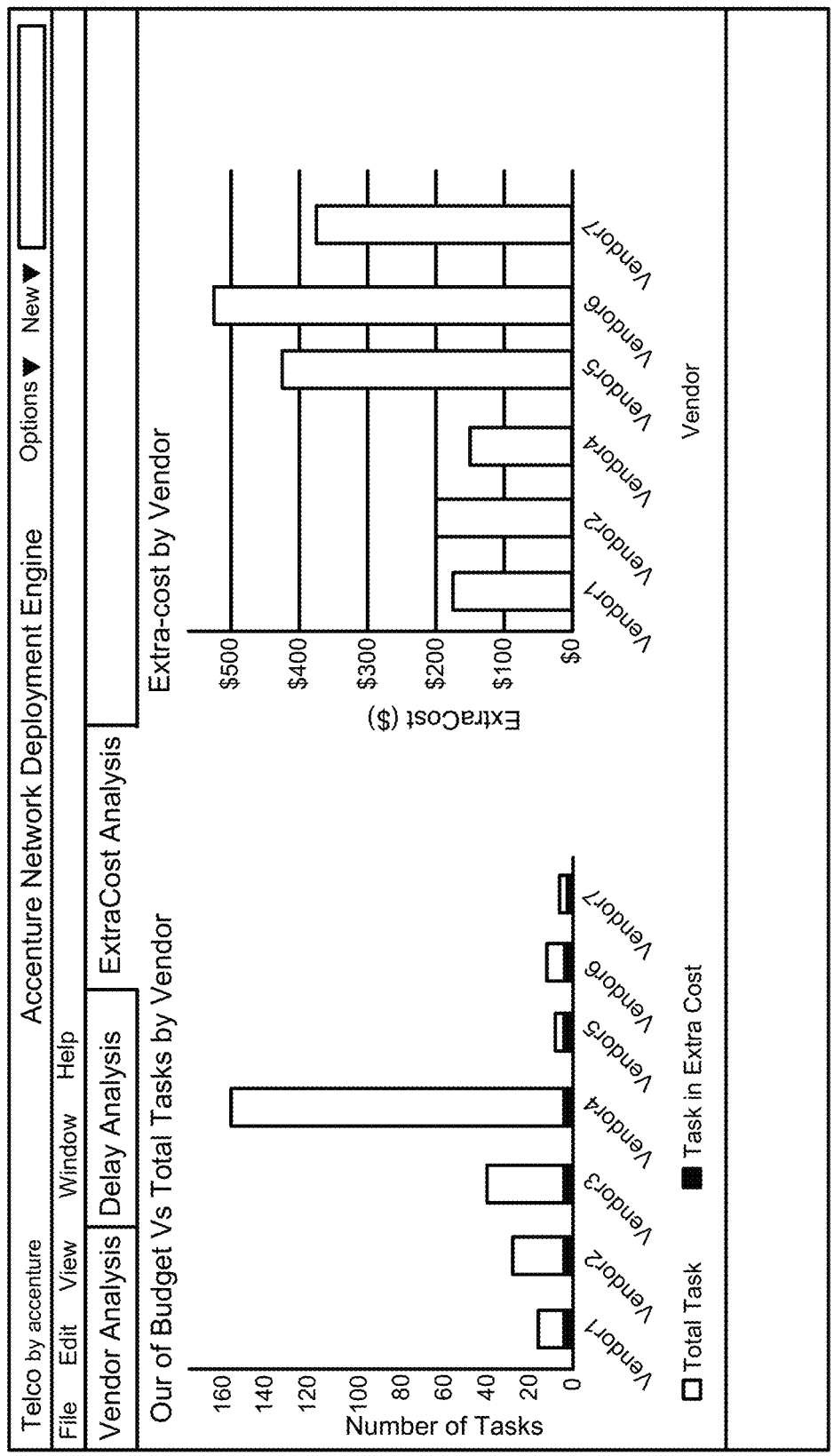

For example, a manager logs into the manager portal 141 and navigates reporting charts in a dashboard and reviews volume, time as it relates to deadlines, and task costs. FIG. 10A shows an example of the dashboard with reports and charts for volume, time and costs, which may be presented via the manager portal 141. Through the dashboard, the manager may drill down into views for cost, time, etc. For example, the network deployment system 100 may receive, via a dashboard in the manager portal 141, a drill down request for at least one of the reports displaying the cost overages and delays to identify details of a task having a cost overage or a delay. A drill down report is displayed showing details of the task. For example, from a cost drill down, the manager may identify tasks that are generating extra costs compared to the estimated cost baselines or from a time drill down, the manager may identify tasks that are delayed. As shown in FIG. 10B, the manager may access vendor analysis tab in the dashboard and identify a vendor with performance below estimates. As shown in FIG. 10C, the manager may reassign tasks to another vendor in a single step. Also, the manager may click on a tag and follow feature to verify progress of new vendor assignment.

A region coordinator coordinates and controls the network build phases for a specific area and helps to find best vendors and coordinate them. The workflow planner 120 plans site search tasks through the planner portal 140. The assigned vendor or technician accesses the network deployment system 100, for example, through a web portal or the mobile tech app 333a, and identifies and performs assigned tasks onsite. The manager approves the assigned vendor and technician and monitors their performance through the manager portal. Field technicians and vendors 110 are responsible for site construction, installation and testing. Through the portal or mobile tech app 333a, a technician or vendor can raise an issue during construction because of missing equipment or other conditions that cause a delay. The raised issue may specify an indication of a potential cause of workflow disruption, and may be entered via the mobile tech app 133. An alert may be generated with the issue, and the manager can view the issue through the manager portal 141 and revise deadlines for tasks that are to be performed after the delayed task.

Figure 11A:
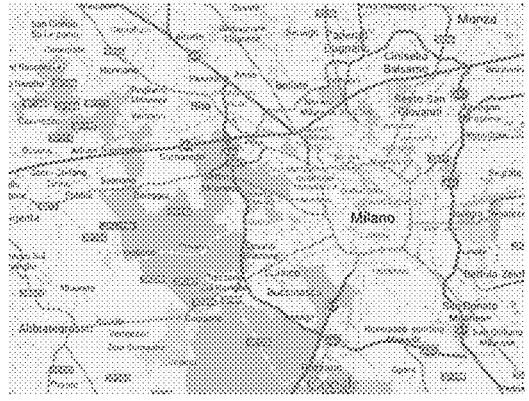
Figure 11B:

Technicians and vendors 110 may use the mobile tech app 333a to perform tasks. In FIG. 7A, tasks for the site area identification sub-process include site search 1.2 and site approval 1.3. A technician or vendor may perform the site search task using the mobile tech app 333a. The mobile tech app 333a may connect to the network deployment management server 105 via the communications server 106 to execute site search tasks and other tasks. Examples of the screen shots of the mobile tech app 333a and a site report are described below and shown in FIGS. 11A-D. In an example for the site search task, a technician logs into the mobile tech app 333a and the mobile tech app 333a displays a site search task and a map indicating the location of the site, such as shown in FIG. 11A. The technician opens up the site search task displayed in the mobile tech app 333a, and the mobile tech app 333a displays the site on a map, and, using the global positioning system (GPS) of the mobile device 350, determines a route to the site from the current location of the technician, and displays the route on the map, such as shown in FIG. 11B. The route may be modified and saved. The technician enters notes in the mobile tech app 333a regarding the site and takes pictures of the site with the camera of the mobile device 350, such as shown in FIG. 11C. Also, a report view can be generated with information and pictures of the site entered by the technician. The manager can log into the manager portal 141 to view the technician report and perform the site approval task 1.3 shown in FIG. 7A, and approve or reject the site.

Additional screens may be generated by the network deployment system 100 in the portals or in a mobile application to execute various tasks. For example, a technician or vendor, using the mobile tech app 333a or accessing the network deployments system 100 via a portal, may request a deadline extension or specify additional costs, and a manager may approve and then deadlines or costs for dependent tasks are automatically adjusted by the network deployment system 100.

Also, the network deployment system 100 integrates with a mapping application, such as GOOGLE MAPS, through an application program interface, to display site location information on a map for both mobile devices and desktop computers. The mobile tech app 333a on the device gets coordinates from the GPS embedded in the mobile device 350 to determine and display a route to the site. Also, for fiber deployments, the backbone nodes can be displayed on a map and the optical fiber path can be shown with a polyline directly on the map in the mobile tech app 333a.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A non-transitory computer readable medium storing machine readable instructions executed by at least one processor to:
   store a library of code segments for tasks of network deployment processes, wherein the code segments include reusable code with workflow parameters for the tasks of the network deployment processes;
   generate a workflow of the network deployment processes, including a process to deploy cellular network infrastructure and a process to connect the cellular network infrastructure to a backhaul network, wherein the workflow is generated from a plurality of the code segments associated with the tasks of the network deployment processes;
   generate one or more role-based graphical user interfaces that present information related to the workflow of the network deployment processes based on a role of a user;
   determine correlations between a plurality of the tasks in the workflow to deploy the cellular network infrastructure and to connect the cellular network infrastructure to the backhaul network;
   determine dependencies between the plurality of tasks based on the correlations to deploy the cellular network infrastructure and to connect the cellular network infrastructure to the backhaul network wherein the dependencies link the code segments of at least two of the plurality of tasks that are each associated respectively with the cellular network infrastructure deploying process and the process to connect the cellular infrastructure to the backhaul network;
   update the code segments for the plurality of tasks with dependency identifiers that identify dependent code segments based on the dependencies;
   store the dependency identifiers and order of performing the tasks in a tracking table;
   determine a chronological order to execute the code segments based on the dependency identifiers stored in the tracking table;
   execute the code segments according to the chronological order, wherein the code segments of at least one of the linked tasks are executed only upon execution of the code segments of dependent linked tasks of the at least one linked task and wherein executing the code segments includes capturing metrics and information for execution of the processes of the workflow, wherein execution of the code segments for at least one of the linked tasks causes the processor to:
      invoke as one of the role-based graphical user interfaces for a field user, a mobile application on a mobile device to perform one of the plurality of tasks in response to determining that the mobile device is within a predetermined distance of a cellular site associated with the task to be performed;
      cause the mobile application to display a map with a route to the cellular site from a current location of the mobile device;
      receive digital images and one or more of the metrics of the cellular site from the mobile device via a report view of the mobile application;
      generate as another one of the role-based graphical user interfaces for a managerial user, a display at a manager portal in a browser of a device other than the mobile device, wherein the display includes the digital images and the metrics received from the mobile application;
      receive an approval of the cellular site via the manager portal, the approval of the cellular site being based at least on one or more of the task, the digital images and the metrics;
      capture the metrics via the code segments associated with the at least one linked tasks; and
      update the workflow based on the metrics;
   execute a next task in the workflow in response to receiving the approval of the cellular site from the manager portal.

2. The non-transitory computer readable medium of claim 1, wherein the at least one processor is to:
   determine an overall deadline to complete the network deployment processes of the workflow;
   estimate a duration to complete each task based on a geographic location of the cellular site of the cellular network infrastructure;
   calculate a deadline to complete each task based on the overall deadline and the duration to complete the task;
   assign resources to the tasks based on the deadlines; and
   instantiate each of the code segments for the tasks with the assigned resources and the deadline for an associated task.

3. The non-transitory computer readable medium of claim 2, wherein the at least one processor is to:
for a task of the tasks, receive a modification to the deadline for the task or one or more of the resources assigned to the task; and
re-compute the deadlines of any tasks affected by the modified deadline or the modified resource.

4. The non-transitory computer readable medium of claim 3, wherein if a modification to the deadline for the task is received, to re-compute the deadlines, the at least one processor is to:
determine whether the assigned resource has capacity to complete the task according to the modified deadline;
if the resource does not have the capacity to complete the task according to the modified deadline, assign a new resource to the task that has capacity to complete the task according to the modified deadline, instantiate the code segment with the new resource and the modified deadline, and re-compute the deadlines of any tasks affected by the modified deadline; and
if the resource has the capacity to complete the task according to the modified deadline, instantiate the code segment with the modified deadline, and re-compute the deadlines of any tasks affected by the modified deadline.

5. The non-transitory computer readable medium of claim 3, wherein if a modification to the resource assigned to the task is received, to re-compute the deadlines, the at least one processor is to:
estimate a new deadline to complete the task based on a capacity of the new resource assigned to the task as specified in the modification to the resource, instantiate the code segment with the new deadline and the new resource, and re-compute the deadlines of any tasks affected by the modified deadline.

6. The non-transitory computer readable medium of claim 2, wherein to assign resources to the tasks, the at least one processor is to:
store the resources to execute the tasks in a resource database table, wherein the resources include vendors, and for each vendor, the table stores a geographic region of the vendor, one or more of the tasks performed by the vendor, cost for each task, and average duration to perform each task; and
identify a vendor from the resource database table to assign to a task of the processes for the workflow, wherein the identified vendor has a geographic region encompassing the geographic location of the cellular site of the cellular network infrastructure and has a task matching the task of the processes, and is determined to be able to complete the task according to the average duration of the matching task.

7. The non-transitory computer readable medium of claim 6, wherein the identified vendor has a cost that satisfies cost constraints for the task.

8. The non-transitory computer readable medium of claim 1, wherein to execute the workflow, the at least one processor is to:
generate a display of the workflow in a dashboard comprising one of the role-based graphical user interfaces; and
modify the display in real-time according to the metrics and information for the network deployment processes of the workflow.

9. The non-transitory computer readable medium of claim 8, wherein to modify the display in real-time, the at least one processor is to:
generate an alert in the graphical user interface when there is a delay in completion of a task of the tasks;
adjust a deadline for completion of the task; and
display the adjusted deadline in the graphical user interface.

10. The non-transitory computer readable medium of claim 8, wherein the metrics comprise cost overages and delays in task completion, and the display comprises reports displaying the cost overages and the delays, and the at least one processor is to:
receive, via the dashboard, a drill down request for at least one of the reports displaying the cost overages and delays to identify details of at least one of the tasks having a cost overage or a delay;
provide, via the dashboard, a drill down report specifying details of the at least one task having the cost overage or the delay;
receive, via the dashboard, a re-assignment of a vendor to the at least one task; and
monitor, via the dashboard, performance of the re-assigned vendor to complete the at least one task.

11. The non-transitory computer readable medium of claim 8, wherein to modify the display, the at least one processor is to:
receive an indication of a potential cause of workflow disruption from the mobile application;
display an alert in the dashboard indicative of the potential cause of workflow disruption; and
execute a deadline adjustment for at least one of the tasks associated with the potential cause of workflow disruption.

12. The non-transitory computer readable medium of claim 1, wherein the site is for fiber optic deployment, and the map displays a polyline in the map indicative of a fiber optic path at the site.

13. The non-transitory computer readable medium of claim 1, wherein the instructions to generate the workflow cause the at least one processor is to:
determine a plurality of variations to the workflow of the processes, wherein the plurality of variations include substituting different resources to at least one of the tasks wherein the resources include at least network equipment assigned to the tasks;
generate multiple simulations corresponding to the variations to the workflow;
identify at least one of the multiple simulations that meets at least time requirements of the network deployment processes; and
select and store for implementation, a workflow corresponding to the simulation that meets the time requirements of the network deployment processes.

14. A network deployment system to deploy network infrastructure, the network deployment system comprising:
a data storage storing a library of code segments that include reusable code with workflow parameters for corresponding tasks of network deployment processes associated with at least one of cellular site deployment, backhaul connections, and fiber optic network deployment and storing database tables including resources to perform the tasks for the network deployment processes;
a network deployment management server comprising at least one processor to:
generate a workflow of the network deployment processes to deploy cellular network infrastructure from a plurality of the code segments, wherein each code segment is instantiated with a resource of the stored resources to perform an associated task of the network deployment processes;
generate one or more role-based graphical user interfaces (GUIs) that present information related to the workflow of the network deployment processes based on a role of a user;
determine correlations between the tasks in the workflow to deploy the cellular network infrastructure and to connect the cellular network infrastructure to a backhaul network;
determine dependencies between the tasks in the workflow to deploy the cellular network infrastructure and to connect the cellular network infrastructure to the backhaul network based on the correlations, wherein the dependencies link the code segments of at least two of the tasks respectively associated with the cellular network deployment process and a backhaul connections process;
update the code segments for the tasks with dependency identifiers that identify dependent code segments based on the dependencies;
store the dependency identifiers and order of performing the tasks in a tracking table;
determine a chronological order to execute the code segments based on the dependency identifiers stored in the tracking table; and
execute the code segments according to the chronological order, wherein the code segments of at least one of linked tasks are executed only upon execution of the code segments of dependent linked tasks of at least one linked task and wherein executing the code segments includes capturing metrics and information for execution of the processes of the workflow, wherein execution of the code segments for at least one of the linked tasks causes the processor to:
invoke as one of the role-based graphical user interfaces for a field user a mobile application on a mobile device to perform one of the tasks in response to determining that the mobile device is within a predetermined distance of a cellular site associated with the task to be performed;
cause the mobile application to display a map with a route to the cellular site from a current location of the mobile device;
receive digital images and metrics of the cellular site from the mobile device via a report view of the mobile application;
generate as another one of the role-based graphical user interfaces for a managerial user, a display at a web portal in a browser of a device other than the mobile device, wherein the display includes a report with the digital images and the metrics received from the mobile application;
receive an approval of the cellular site via the web portal, the approval of the cellular site being based at least on one or more of the task, the digital images and the metrics;
capture the metrics via the code segments associated with the at least one linked tasks;
update the workflow based on the metrics; and
execute a next task in the workflow in response to receiving the approval of the cellular site from the web portal.

15. The network deployment system of claim 14, comprising:
a communications server generating the web portal comprising a planner portal, and the planner portal includes a planning view of the workflow, wherein the network deployment management server is to receive a modification to the workflow via the planner portal, and determine at least one of a new deadline and a new resource for at least one of the tasks in the workflow based on the modification,
wherein the planning view includes the resource associated with each task, and the network deployment management server determines the resource for each task by querying the database tables for a resource that has a capacity to perform a task within a time frame and in a specified geographic location.

16. The network deployment system of claim 15, wherein the web portal comprises a manager portal, and the manager portal includes a graphical user interface to display information for at least one of the tasks, wherein the at least one task includes an operation to accept or deny a portion of the network infrastructure deployment based on the displayed information.

17. A method comprising:
generating a workflow of processes to deploy network infrastructure, wherein the workflow is generated from a plurality of code segments associated with tasks of the workflow processes, wherein the code segments include reusable code with workflow parameters for the tasks in the network deployment processes;
generating one or more role-based graphical user interfaces that present information related to the workflow of the processes based on a role of a user;
determine correlations between the tasks in the workflow to deploy the network infrastructure and to connect the network infrastructure to a backhaul network;
determining dependencies between a plurality of the tasks based on the correlations and technical requirements to deploy the network infrastructure wherein the code segments of at least two of the plurality of tasks are linked, the at least two tasks are each associated respectively with a network infrastructure deploying process and a process to connect the network infrastructure to the backhaul network;
updating the code segments for the plurality of tasks with dependency identifiers that identify dependent code segments based on the dependencies;
storing the dependency identifiers and order of performing the tasks in a tracking table;
determining a chronological order to execute the plurality of code segments based on the dependency identifiers stored in the tracking table;
executing one or more of the plurality of code segments according to the chronological order, wherein the code segments of at least one of the linked tasks are executed only upon execution of the code segments of dependent linked tasks of the at least one linked task and wherein executing the code segments includes capturing metrics and information for execution of the processes of the workflow, wherein execution of the code segments for at least one of the linked tasks includes:
invoking as one of the role-based graphical user interface for a field user, a mobile application on a mobile device to perform one of the plurality of tasks in response to determining that the mobile device is within a predetermined distance of a cellular site associated with the task to be performed;
causing the mobile application to display a map with a route to the cellular site from a current location of the mobile device;

receiving digital images and metrics of the cellular site from the mobile device via a report view of the mobile application;

generating as another one of the role-based graphical user interfaces for a managerial user, a display at a manager portal in a browser of a device other than the mobile device, wherein the display includes the digital images and the metrics received from the mobile application;

receiving an approval of the cellular site via the manager portal, the approval of the cellular site being based at least on one or more of the task, the digital images and the metrics;

capturing the metrics via the code segments associated with the at least one linked tasks:

updating the workflow based on the metrics; and executing a next task in the workflow in response to receiving the approval from the manager portal.

\* \* \* \* \*